(12) United States Patent
Verbanck et al.

(10) Patent No.: US 12,017,385 B2
(45) Date of Patent: Jun. 25, 2024

(54) APPARATUS AND METHOD FOR PRODUCING AND DISPENSING A REACTION MIXTURE

(71) Applicant: SOUDAL, Turnhout (BE)

(72) Inventors: Karel Verbanck, Ghent (BE); Lieven Sichien, Uitbergen (BE); Jurgen Vandervelden, Turnhout (BE); Yvo F. H. Trimbos, Roosendaal (NL); Ivan Boeykens, Vosselaar (BE); Bart Lannoo, Tielt (BE)

(73) Assignee: SOUDAL, Turnhout (BE)

( * ) Notice: Subject to any disclaimer, the term of this patent is extended or adjusted under 35 U.S.C. 154(b) by 728 days.

(21) Appl. No.: 17/049,134

(22) PCT Filed: Apr. 26, 2019

(86) PCT No.: PCT/EP2019/060769
§ 371 (c)(1),
(2) Date: Oct. 20, 2020

(87) PCT Pub. No.: WO2019/207121
PCT Pub. Date: Oct. 31, 2019

(65) Prior Publication Data
US 2021/0237314 A1     Aug. 5, 2021

(30) Foreign Application Priority Data

Apr. 26, 2018  (BE) .................................. 2018/5279

(51) Int. Cl.
| B29B 7/76 | (2006.01) |
| B29B 7/72 | (2006.01) |
| B29B 7/74 | (2006.01) |
| B29B 7/80 | (2006.01) |
| B29B 7/82 | (2006.01) |
| B29C 44/34 | (2006.01) |
| C08G 18/08 | (2006.01) |
| B29K 75/00 | (2006.01) |
| B29K 105/04 | (2006.01) |
| C08G 101/00 | (2006.01) |

(52) U.S. Cl.
CPC ............ B29B 7/7615 (2013.01); B29B 7/728 (2013.01); B29B 7/7419 (2013.01); B29B 7/7428 (2013.01); B29B 7/7447 (2013.01); B29B 7/7678 (2013.01); B29B 7/801 (2013.01); B29B 7/826 (2013.01); B29C 44/3442 (2013.01); C08G 18/14 (2013.01); *B29K 2075/00* (2013.01); *B29K 2105/04* (2013.01); *C08G 2101/00* (2013.01); *C08G 2110/0083* (2021.01)

(58) Field of Classification Search
CPC ..... B29B 7/228; B29B 7/7409; B29B 7/7419; B29B 7/7428; B29B 7/7447; B29B 7/7615; B29B 7/7678; B29B 7/801; B29B 7/826; B29C 44/3442; B29K 2075/00; B29K 2105/04; C08G 18/14; C08G 2101/00; C08G 2101/0083
See application file for complete search history.

(56) References Cited

U.S. PATENT DOCUMENTS

| 2,946,488 | A |  | 7/1960 | Kraft |
| 3,462,128 | A |  | 8/1969 | Dallois et al. |
| 4,170,319 | A |  | 10/1979 | Suh et al. |
| 4,204,977 | A | * | 5/1980 | Zwirlein ............... B29B 7/7404 239/413 |
| 4,372,352 | A | * | 2/1983 | Coppola ............. B29C 44/3442 141/90 |
| 5,375,743 | A |  | 12/1994 | Soudan |
| 8,075,302 | B1 | * | 12/2011 | McClellan .............. B29B 7/603 366/159.1 |

FOREIGN PATENT DOCUMENTS

| DE | 2315867 A1 | 10/1974 |
| DE | 2724911 A1 | 7/1978 |
| DE | 3611728 C1 | 4/1987 |
| DE | 3918027 A1 | 12/1990 |
| EP | 0757618 B1 | 2/1997 |
| EP | 0806238 A1 | 11/1997 |
| NL | 6610193 A | 4/1967 |
| WO | 87/06154 A1 | 10/1987 |

OTHER PUBLICATIONS

International Search Report mailed Aug. 9, 2019, issued in corresponding International Application No. PCT/EP2019/060769, filed Apr. 26, 2019, 4 pages.
Written Opinion of the International Searching Authority mailed Aug. 9, 2019, issued in corresponding International Application No. PCT/EP2019/060769, filed Apr. 26, 2019, 8 pages.

* cited by examiner

*Primary Examiner* — John M Cooney
(74) *Attorney, Agent, or Firm* — Christensen O'Connor Johnson Kindness PLLC (57) ABSTRACT

Apparatuses for producing and dispensing a reaction mixture include a mixing head for mixing the reaction components that are fed via two supply lines. The apparatuses also include a decompression system to relieve pressure from the supply lines to avoid the reaction components seeping into the mixing head. The decompression system includes two pressure vessels each with two sides, separated by a membrane. One of these sides forms an expansion chamber for the reaction component while the other side is connected to a pneumatic system. With this pneumatic system, the expansion chamber can be pressurized before the production of the reaction mixture is started. After the production of the reaction mixture, the pressure can be relieved.

28 Claims, 6 Drawing Sheets

APPARATUS AND METHOD FOR PRODUCING AND DISPENSING A REACTION MIXTURE

The present invention relates to an apparatus for producing and dispensing a reaction mixture, in particular a foaming reaction mixture for producing a foam. The reaction mixture is produced in the apparatus starting from at least a first and second reaction component, which are kept under pressure in a first and a second container respectively. The apparatus comprises a mixing head for mutually mixing the first and second reaction component, which mixing head is provided with an outlet for the mixture of both reaction components. The apparatus also comprises a first supply line for feeding the first reaction component from the first container under the pressure prevailing therein to the mixing head, a second supply line for feeding the second reaction component from the second container under the pressure prevailing therein to the mixing head, a first shut-off valve in the first supply line and a second shut-off valve in the second supply line, the first and the second shut-off valves both having an open and closed position, a third shut-off valve for closing the first supply line in the mixing head and a fourth shut-off valve for closing the second supply line in the mixing head, the third and the fourth shut-off valve comprising a common plunger which is configured to slide, in particular in its longitudinal direction, for opening and closing the third and the fourth shut-off valve simultaneously, a first expansion chamber connected to the first supply line between the first and the third shut-off valve, a second expansion chamber connected to the second supply line between the second and fourth shut-off valve, a pneumatic system for the pressurisation of and pressure relief from the first and second expansion chambers and from the first supply line as from the first to the third shut-off valve and from the second supply line as from the second to the fourth shut-off valve, and a control system for operating the pneumatic system as well as the first, second, third and fourth shut-off valves for starting and stopping the production and dispensing said reaction mixture.

Such an apparatus is known from EP 0 757 618. This known apparatus is used to mix a polyol component and an isocyanate component. The mixing head is located in a spray gun that can be used to spray the foaming reaction mixture. Both reaction components are kept under a pressure of 6 to 12 bars in a container, more particularly in a bottle that is pressurised by means of a bottle filled with nitrogen gas. The reaction components are fed under this pressure into the mixing head where they are mixed. A problem with the shut-off valves in the spray gun is that they are unable to form a perfect seal for the first and second supply lines, as a result of which the reaction components may still seep into the mixing head after the spraying has stopped, where they can react with one another and consequently pollute the mixing head, and possibly even block the spray gun. Although the supply lines are not only shut off in the spray gun but also closer to the containers, the reaction components in the supply lines remain under pressure due to the elastic expansion of the supply lines. The invention described in EP 0 757 618 therefore consists of relieving the pressure in the supply lines after having closed the shut-off valves in the spray gun and in the supply lines on the side of the containers, in order for the reaction components to be no longer under pressure at the level of the shut-off valves in the spray gun, thus making it impossible for them to seep into the mixing head.

The pressure-relief system described in EP 0 757 618 consists of a cylinder housing containing a piston that is pneumatically pressurized at the start of the spraying process to push the respective reaction component out of the expansion chamber. When the spraying stops, the pneumatic pressure of the piston is removed, enabling the expansion chamber to expand again, which allows the reaction component to flow from the supply line into the expansion chamber through the pressure prevailing in the supply line, in such a way that the pressure in the supply line is removed.

A problem with the pressure-relief system according to EP 0 757 618 is that the isocyanate reaction component reacts with water to form solid urea compounds. Since compressed air always contains water vapour, the isocyanate component will react when it comes into contact with the compressed air, i.e. with the water in the compressed air. If the compressed air contains too much moisture, it is even possible that the water will condense inside the pneumatic system, due to the increase in the dew point temperature when the air is compressed. Despite the fact that the pistons of the pressure-relief system have rubber sealing rings, it is necessary pursuant to EP 0 757 618 to provide a double piston in the pressure-relief system, with a solvent being provided in between the two pistons, more particularly Mesamoll®. The solvent ensures that the small residue of reaction component left on the cylinder wall with every movement of the piston is dissolved in the solvent and is thus no longer able to react with the moisture in the compressed air. In this way, the pressure-relief system can thus continue to work autonomously for a considerable period of time.

A disadvantage of such a pressure-relief system, however, is that it is a relatively complex and expensive system. The cylinder wall has to be perfectly smooth because otherwise too much residue of the reaction component could remain on the cylinder wall with every movement of the piston and thus contaminate the solvent too quickly, despite the presence of rubber gaskets around the piston. In practice, the known pressure-relief system also requires regular and relatively cumbersome maintenance. After all, the solvent and the gaskets on the pistons usually have to be replaced every year. This work takes a number of hours and must be carried out by specialised personnel. The decompression system thus makes the apparatus relatively expensive to buy and also to maintain.

An object of the invention is therefore to provide a new apparatus for producing and dispensing a reaction mixture, the decompression system of which is less complex and also requires less maintenance.

To this end, the apparatus according to the invention is characterised in that said first and second expansion chamber are formed respectively by a first and a second pressure vessel, each having two sides separated from each other by a membrane, of which the first side forms the first and second expansion chamber, respectively, which are arranged to be filled with said first and respectively said second reaction component, and of which the second side is connected to said pneumatic system to be filled with a gas, which gas is in contact with the reaction component on the first side of the pressure vessel via said membrane, said first and said second pressure vessels being detachably connected to said pneumatic system and to the first and second supply lines respectively.

Since the reaction components are separated in the first and ub the second pressure vessel by a membrane from the gas, in particular from the compressed air, the reaction component cannot possibly come into contact with the gas, more particularly with the moisture present in it. In contrast to the prior art pressure-relief system with the cylinder-piston mechanism, no double separation with a solvent in between thus needs to be provided in the pressure-relief system with the pressure vessels, according to the invention. Nor is a solvent change therefore required during the maintenance of the apparatus.

During maintenance, the two pressure vessels do not have to be dismantled and cleaned, as they can easily be replaced by new pressure vessels. After all, the construction of such pressure vessels is so simple that the cost price can be kept low. If the pressure vessels can be opened to replace the membrane in them, they can also be reused if required. The used pressure vessels can therefore by recycled on a larger scale and thus in a more efficient and safe manner then if this had to be done on site by the maintenance technician on each occasion.

The use of a pressure vessel containing a membrane as a membrane pump for mixing reaction components is already known from DE 39 18 027 and NL 6610193. However, an important disadvantage of such apparatus is that the pressure on the reaction components fluctuates during the production of the reaction mixture because each time the membrane pump is squeezed empty, it has to be refilled with the reaction component. This can only be avoided by making the membrane pump sufficiently large, and by refilling it each time, so that there is always enough reaction component in the membrane pump itself. Naturally, voluminous membrane pumps will be required for dispensing larger volumes of reaction mixture. These require a sufficiently powerful actuator. Furthermore, it is not easy to keep the reaction components at the right pressure at all times with such pumps. A final disadvantage is that either an extra pump is required to fill the membrane pump, or that the reaction components must also be under pressure in the containers, whereby that pressure ensures that the reaction components remain under pressure at the level of the mixing head and can thus seep into the mixing head.

In a particular embodiment of the apparatus according to the invention, said control is provided with a manual or automatic actuator for starting and stopping the production and dispensing of the reaction mixture.

The manual actuator is for example formed by a trigger or push button on the spray gun, operating as a switch. With a manual actuator, the production of the reaction mixture can easily be started and stopped by the person operating the spray gun containing the mixing head. In an automatic installation, for example in an automatic filling system, an automatic actuator can be applied that is preferably linked to a sensor. With the automatic actuator, the production and dispensing of the reaction mixture can be started and stopped automatically in this manner, as soon as the spray gun and the article to which the reaction mixture is to be applied are thus positioned correctly in relation to each other.

In a particular embodiment of the apparatus according to the invention, the pneumatic system is configured to bring the first expansion chamber under a pressure which is higher than the pressure in the first container and to bring the second expansion chamber under a pressure which is higher than the pressure in the second container.

This embodiment allows the reaction component present in the first and second expansion chambers to be squeezed out of the expansion chamber before the production and dispensing of the reaction mixture commences. When the first and second expansion chambers have been emptied in this way, the production and dispensing of the reaction mixture will thus immediately occur under the pressure existing in the first and second containers. Both reaction components will thus be mixed in the right proportions from the start.

In a particular embodiment of the apparatus according to the invention, the aforementioned control is configured to pressurise said first and second expansion chambers by means of said pneumatic system before the first and second shut-off valves referred to above are opened.

Since both expansion chambers are pressurized in this way before the first and the second shut-off valves are opened, it will be impossible for the reaction components to be squeezed into these expansion chambers under the influence of the pressure exerted on them in the containers. The membranes in the pressure vessels will thus not be pushed further towards the second side of the pressure vessels. The movement and thus the deformation of these membranes is hence kept to a minimum, resulting in minimal wear and tear of the membranes.

Said control is preferably configured to only open the aforementioned third and fourth shut-off valve after having opened the first and second shut-off valve.

Since a larger pressure is exerted in the pressure vessels than in the containers, the expansion chambers will first be emptied via the first and second shut-off valve. By only opening the third and fourth shut-off valve afterwards, the reaction components are fed to the mixing head under the pressure existing in the containers right from the start of the production of the reaction mixture. Furthermore, it is avoided that when starting and stopping the production of the reaction mixture in rapid succession, the amount of reaction component in the expansion chambers can accumulate, which would cause greater deformation of the bladders or membranes in the pressure vessels and thus subject them to greater wear and tear.

In a particular embodiment of the apparatus according to the invention, said control is configured to relieve the pressure from said first and said second expansion chamber after the third and fourth shut-off valve have been closed.

In this way, the pressure of the respective reaction component on the third and fourth shut-off valve is automatically removed after the production of the reaction mixture is stopped, which thus automatically avoids the reaction components seeping further into the mixing head.

Said control is preferably further configured to relieve the pressure from said first and said second expansion chamber only after a predetermined period of time after having closed the third and fourth shut-off valve, more particularly after a predetermined period of time of at least 5 seconds, preferably after a predetermined period of time of at least 10 seconds.

Since the expansion chambers remain empty during this period of time, and since the pressure on the two reaction components in the respective supply lines remains equal to the pressure of the reaction component in its container, the production of the reaction mixture can be immediately restarted during this period of time. Due to the relatively short period, no reaction component will be able to seep further into the mixing chamber under the pressure exerted on the reaction components.

Said control is preferably furthermore configured to close said first and said second shut-off valve before the pressure is relieved from said first and second expansion chamber.

Since the first and second shut-off valve are closed before the pressure is relieved from the expansion chambers, no reaction component will be able to flow from its container to the expansion chamber, and the expansion chamber will thus only need to take in the minimal amount of reaction component required to relieve the pressure from the supply line. This way, only minimal movement and deformation will be required of the bladders or membranes in the pressure vessels, resulting in only minimal wear and tear.

In a particular embodiment of the apparatus according to the invention, said pneumatic system is provided to bring the pressure of the gas in the second side of the first and the second pressure vessel substantially to atmospheric pressure when releasing the pressure from the first and the second expansion chamber.

Since the pressure in the supply lines will also be substantially the same as the atmospheric pressure, there will no longer be a pressure difference over the third and the fourth shut-off valve and no reaction component will be able to seep through these shut-off valves.

In a particular embodiment of the apparatus according to the invention, the first and the second pressure vessels is provided with a support surface for limiting the movement of said membrane in the direction of the first and the second expansion chamber respectively, the support surface being preferably provided for substantially completely supporting the membrane.

In this embodiment, the membranes do not have to absorb the pressure difference between the gas pressure on the second side of the membranes and the pressure of the reaction component on the first side of the membranes themselves, as a result of which these membranes can be made lighter and as a result of which the pressure of the gas can be considerably higher than the pressure of the reaction components, in such a way that the expansion chambers can be emptied relatively quickly by the two pneumatic systems. The production of the reaction mixture can therefore begin relatively quickly after the apparatus is activated, in particular after the actuator is actuated.

Said control is preferably configured to open said third and said fourth shut-off valve only after the membrane of the first and second pressure vessel has been pressed against said supporting surface by the first and the second pneumatic system.

The production of the reaction mixture therefore only starts after the pressure on the reaction components has become equal to the pressure in the containers.

In a particular embodiment of the apparatus according to the invention, said membrane is convex, with the convex side of the membrane being directed towards the first and the second expansion chamber respectively.

The shape of the membrane must be considered in an unloaded condition in this respect, i.e. when both sides of the membrane are in contact with the atmosphere. Due to the convex shape of the membrane, it does not have to be stretched or only to a minimal extent to empty the expansion chamber so that the membrane is only subjected to minimal wear and tear.

The membrane preferably remains convex when the pressure is relieved from the first and the second expansion chamber.

In a particular embodiment of the apparatus according to the invention, instead of being a diaphragm, said membrane is bladder-shaped, with the first and the second expansion chamber being located outside the bladder shape.

The shape of the membrane must be considered in an unloaded condition in this respect, i.e. when both sides of the membrane are in contact with the atmosphere. When the bladder has a sufficiently large size, the membrane doesn't have to be stretched or only minimally due to the bladder-shape to empty the expansion chamber so that the membrane is only subjected to minimal wear and tear.

In other words, the volume of the pressure vessel on the first side of the membrane is so great that it can absorb the volume of reaction component flowing into the expansion chamber when the pressure is relieved from the supply line, without a need for the membrane to flip, i.e. turn from convex into concave. Since the deformation of the membrane remains limited, it will be subject to less wear and tear.

In a particular embodiment of the apparatus according to the invention, said membrane is manufactured from a fluoropolymer elastomeric material.

It has been found that such a material is chemically resistant to the reaction components, in particular to isocyanate and polyol reaction components. Tests have demonstrated that such a membrane is still fully intact even after more than 300,000 spray cycles.

In a particular embodiment of the apparatus according to the invention, in said first supply line between said first shut-off valve and said first container, and in said second supply line, between said second shut-off valve and said second container, a first and a second float chamber is provided, containing a first and a second float respectively for the detection of the level of respectively the first and the second reaction component in the first and the second float chamber, said first and said second float chamber preferably have an internal volume which is larger than 2 litres, preferably larger than 3 litres and more preferably larger than 4 litres.

The floats in these float chambers facilitate detection of the reaction component's container being empty. When the latter is empty, the gas used to pressurise the reaction component will after all enter the float chamber via the supply line, thereby lowering the liquid level in the float chamber. In this case, the control is preferably configured to limit the amount of reaction component that can be fed out of the float chamber after the float has reached its lowest limit, in order to prevent gas from the float chamber getting into the supply line behind the float chamber.

Due to the relatively large volume that the float chamber preferably has, it is possible to connect a new container with a reaction component to the supply line without a need to degas the float chamber. The new container is after all connected at atmospheric pressure, which allows the gas in the float chamber to expand. When the pressure in the container is increased, fresh reaction component will be squeezed into the line and into the float chamber, as a result of which the gas in the float chamber will be compressed under the pressure prevailing in the container in such a manner that the float will once again have risen above its minimum level. The gas that was present in the supply line between the float chamber and the container can also be squeezed into the float chamber. Since the outlet of the float chamber is located in the lower part of the float chamber, no gas will end up in the supply line behind the float chamber.

In a particular embodiment of the apparatus accordance to the invention, a first and a second filter respectively are provided respectively in said first supply line, between said first shut-off valve and said first container, and in said second supply line, between said second shut-off valve and said second container, which filters are located in a first and a second housing respectively.

The filters ensure that solid impurities are filtered from the liquid reaction components so as to prevent these causing blockages. For example, solid impurities may have formed in the isocyanate component if it has come into contact with moisture from the air.

The first and second housing, i.e. the housings of the filters, form preferably also the first and second float chamber.

The advantage of this embodiment is that it enables a more compact design and that the filter housings do not need to be vented.

As an alternative with separate filter housings and float chambers, said first float chamber is preferably located in the first supply line between the first filter and the first container, and the second float chamber is located in the second supply line between the second filter and the second container, the first and the second filter being preferably provided with a venting system.

In this alternative embodiment, there is again no need to vent the two float chambers since the compressed gas contained therein only occupies a limited space at the top of the float chambers. The housings of the filters located behind the float chambers in the supply lines are preferably vented in order to keep the filters and their housings compact. The venting only needs to take place at the time the filters are replaced provided the control referred to above is configured not to allow any gas from the float chambers to the rest of the supply line.

The housing of the first filter and the housing of the second filter are preferably provided with heating elements to heat the first and second reaction component respectively in these housings. If separate float chambers are present, they are preferably also provided with heating elements.

By providing these heating elements, it is possible to always feed the reaction components at the same temperature, and thus with the same viscosity, via the supply lines in such a way that the reaction components can always be mixed correctly and in the right proportion in the mixing head.

Preferably, a heating element is provided in the first supply line and in the second supply line to heat the reaction component which is present in the supply line.

In a particular embodiment of the apparatus according to the invention, said first and said second container are configured to be brought under a pressure of 5 to 10 bars, preferably under a pressure of 6 to 8 bars.

The reaction components can be adequately mixed in the mixing chamber under this pressure. The advantage of such relatively low pressures is that the pressure in the pneumatic system can also be limited so that the usual compressed air systems can be used, either through a central compressed air system or through a separate air compressor.

In a particular embodiment of the apparatus according to the invention, said pneumatic system comprises a first pneumatic system for the pressurisation of and for the pressure relief from the first expansion chamber and from said first supply line as from said first to said third shut-off valve, and a second pneumatic system for the pressurisation of and the pressure relief from the second expansion chamber and from said second supply line as from said second to said fourth shut-off valve.

In an alternative embodiment of the apparatus according to the invention, said pneumatic system comprises a common pneumatic system for the pressurisation of and the pressure relief from the first and the second expansion chamber and said first supply line as from said first to said third shut-off valve, and said second supply line as from said second to said fourth shut-off valve.

In a particular embodiment of the apparatus according to the invention, it comprises said first container which is filled with the first reaction component and said second container that is filled with said second reaction component, said first supply line being connected to the first container, and said second supply line being connected to the second container.

The invention also relates to a method for producing and dispensing a reaction mixture with an apparatus according to the invention, in which method said first supply line is connected to said first container, which is filled with the first reaction component, and said second supply line is connected to said second container which is filled with the second reaction component, after which the first and the second container are pressurised.

In a particular embodiment of the method according to the invention, when the first container is empty it is replaced by a filled first container and when said second container is empty it is replaced by a filled second container.

Lastly, the invention also relates to the use of a first container and a second container for carrying out a process according to the invention, the reaction mixture being a polyurethane reaction mixture containing no or insufficient physical blowing agents, preferably less than 4% by weight and more preferably less than 2% by weight, to be dispensed in the form of a froth and the first and the second container being arranged to be pressurised, in particular under a pressure of at least 5 bars.

An advantage of such containers is that they can not only be pressurized for dispensing the reaction mixture, but since the reaction mixture is not dispersed in the form of a froth, and both reaction components thus contain no or only a relatively small amount of physical blowing agent, the pressure can be removed from both reaction components, in particular from the supply lines to the mixing head, without causing them to expand.

In a particular embodiment of the use according to the invention, the first container contains an isocyanate reaction component and the second container a polyol reaction component, which polyol reaction component mainly contains water as blowing agent for the production of a polyurethane foam. The polyol reaction component is preferably free of physical blowing agents.

Physical blowing agents are, in particular, liquids with a low boiling point such that they evaporate during the polyurethane reaction to form a gas as blowing agent. In this embodiment, the absence of physical blowing agents ensures that no pressure can be generated in the apparatus if certain parts of it, such as part of the supply lines, are in hot conditions.

Further details and advantages of the invention will become apparent from the following description of an apparatus according to the invention. This description is given as an example only and is not intended to limit the scope of the invention. The reference numerals relate to the attached drawings, in which.

The apparatus according to the invention is intended for producing and dispensing a reaction mixture. The reaction mixture is a mixture of at least two reaction components, each of which is contained in a pressure container. The first container 1 contains the first reaction component, while the second container 2 contains the second reaction component. For example, the reaction mixture may be a polyurethane reaction mixture, which may in particular contain a blowing agent, such as water, for producing a polyurethane foam. Such a reaction mixture is usually produced by mixing an isocyanate component as the first reaction component with a polyol component as the second reaction component. Both reaction components themselves consist of a mixture of different products, which may for example include catalysts, stabilisers, chain extenders, cross-linking agents, blowing agents, pigments, dyes and the like, in addition to the polyol compound and the isocyanate compound. The reaction mixture may also comprise a polyisocyanurate reaction mixture, for example.

The reaction mixture preferably contains water as a chemical blowing agent. The reaction mixture is preferably free from physical blowing agents or contains such a small quantity thereof that the reaction mixture is not dispensed in the form of a froth. After mixing both reaction components, the reaction mixture preferably contains less than 4% by weight physical blowing agents, and more preferably less than 2% by weight. The foam system is therefore not a froth system that needs to be kept under pressure and that would produce additional pressure when the pressure is relieved. Furthermore, the absence of physical blowing agents, or the limited quantity of these, ensures that no pressure can be generated in the apparatus if certain parts of it, such as part of the supply lines, are in excessively hot conditions.

Figure 1:
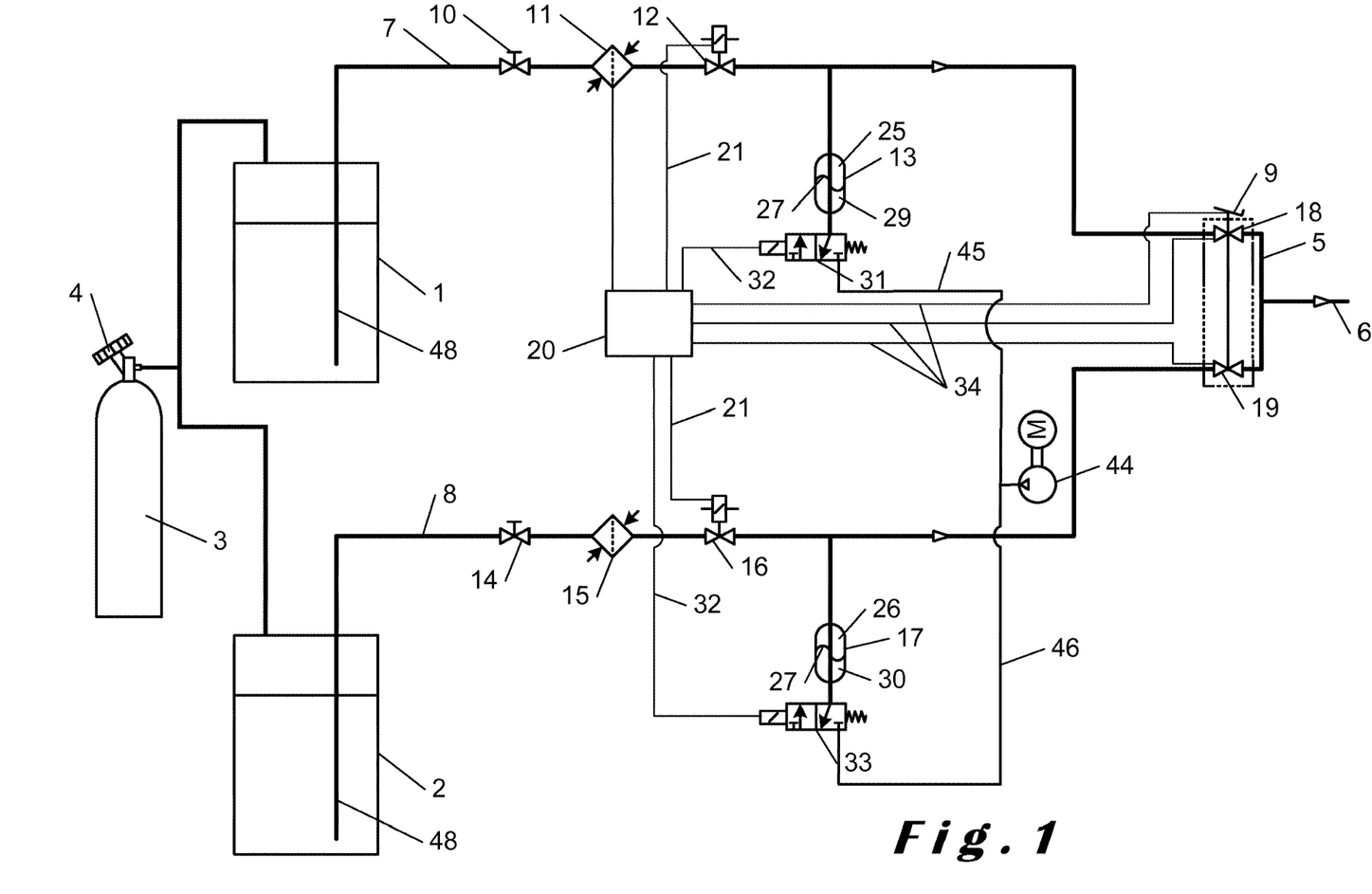
FIG. 1 shows a diagram of a particular embodiment of the apparatus according to the invention.
Figure 4:
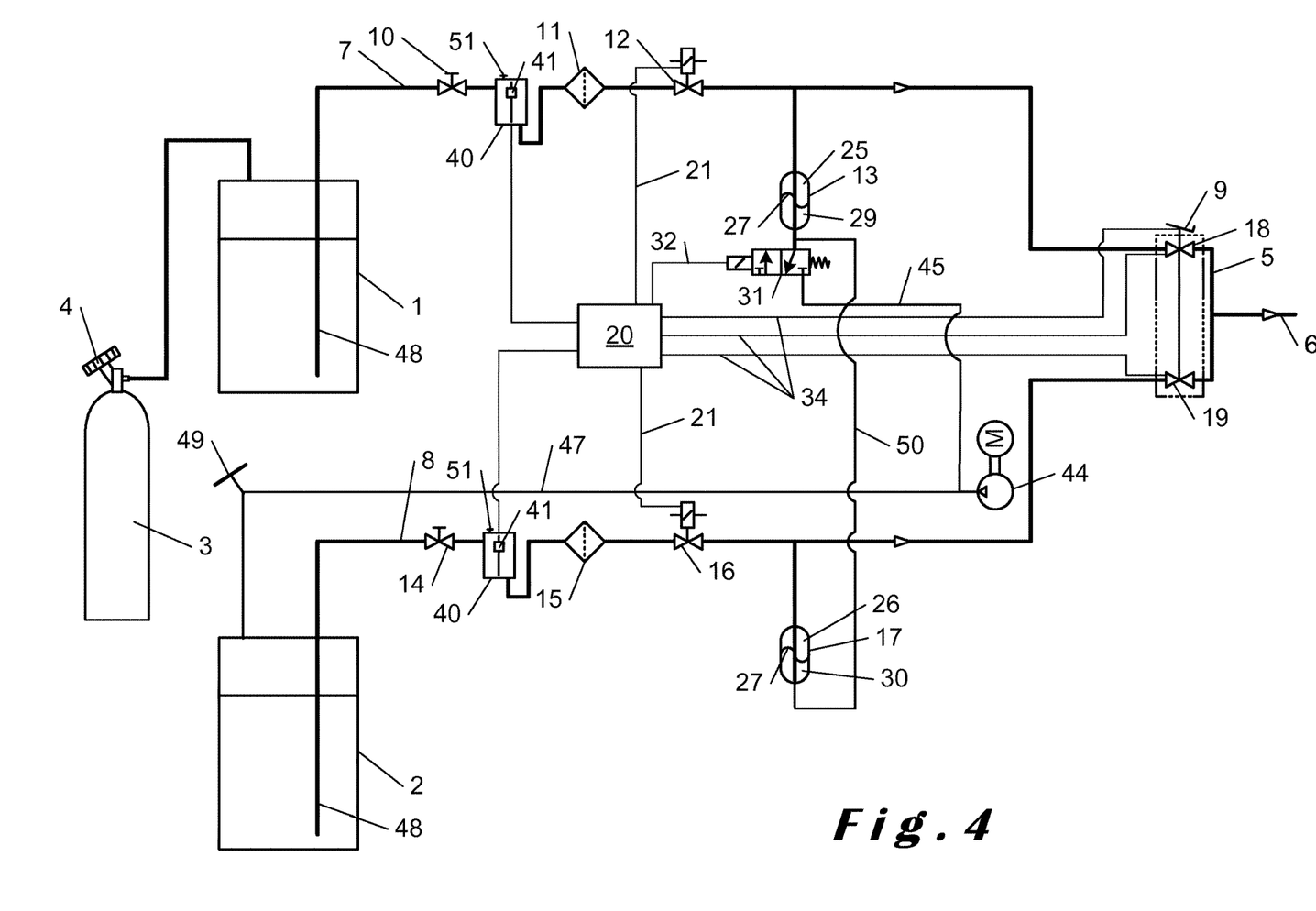
FIG. 4 shows a diagram of an alternative embodiment of the apparatus according to the invention.

The reaction components are pressurised in the first 1 and the second container 2, with a riser duct 48 being provided in order to remove the reaction component from the bottom of the container 1, 2. To pressurise the containers, both containers 1, 2 are connected to a gas bottle 3 with a liquid gas. This gas bottle 3 preferably contains liquid nitrogen. Such nitrogen is substantially free of water, which means that no reaction will occur in the containers with the reaction component. This is especially important for the isocyanate component as it can react quickly with water to form urea compounds. As shown in FIG. 1, both containers 1, 2 can be pressurised with a single gas bottle 3 but, if necessary, each container 1, 2 can be connected to a separate gas bottle 3. The latter makes it possible to set a separate pressure for the two reaction components, taking into account the fact that the viscosity of the two reaction components will normally be different. Preferably one of the containers, more particularly container 2 for the polyol component, is connected to compressed air via a line 47. This variant embodiment is depicted in FIG. 4. The advantage of this embodiment is that less nitrogen gas will be required for dispensing the reaction mixture.

FIG. 1 shows a pressure control valve 4 on the gas bottle 3, which can be used to set the pressure in the containers 1, 2. In the variant embodiment of FIG. 4, a pressure control valve 49 is also fitted on compressed air line 47. With these pressure control valves 4, 47, the pressure in the containers is for example set to 6 bars.

At the end, the apparatus comprises a mixing head 5 in which the reaction components are mixed. The mixing head 5 is provided with an outlet 6 for dispensing the reaction mixture. In the apparatus according to the invention, both reaction components are fed to the mixing head 5 under the pressure prevailing in the containers 1, 2. The first reaction component is fed via a first supply line 7 to the mixing head 5, while the second reaction component is led via a second supply line 8 to the mixing head 5. The pressure on the reaction component at the level of the mixing head 5 may be smaller than the pressure in the container 1, 2 due to possible pressure losses in the supply lines. Since the pressure loss will be greater for more viscous liquids, it may be appropriate to put the container for the more viscous reaction component, in particular of the polyol component, under greater pressure than the container for the less viscous reaction component.

The mixing head 5 can form part of a mixing gun equipped with a trigger 9. The trigger 9 forms a manual actuator for starting and stopping the production and dispensing of the reaction mixture, and to that effect, it is preferably connected to a switch connected to the control system 20. For example, when the apparatus is incorporated in an automated filling installation, the trigger 9 can nevertheless be replaced by an automatic actuator.

In the first supply line 7, between the first container 1 and the mixing head 5, there is successively a first manual shut-off valve 10, a first filter 11, a first automatic shut-off valve 12 and a first pressure vessel 13. In the second supply line 8, between the second container 2 and the mixing head 5, there is successively a second manual shut-off valve 14, a second filter 15, a second automatic shut-off valve 16 and a second pressure vessel 17. In the mixing head 5, the first supply line 7 ends in a third automatic shut-off valve 18 and the second supply line 8 ends in a fourth automatic shut-off valve 19. The third and the fourth automatic shut-off valve 18, 19 preferably contain a common plunger that is moved in its longitudinal direction to open and close both shut-off valves simultaneously, as disclosed for example in U.S. Pat. No. 5,375,743. The various automatic shut-off valves are operated through a control. This control is made up, for example, of a PLC control 20, i.e. a programmable control, which is connected by electrical wiring 21 to the automatic shut-off valves 12, 16 and by electrical wiring 34 to the shut-off valves 18, 19. The automatic shut-off valves can be either operated directly electrically, but they are preferably pressure-controlled shut-off valves that are operated by compressed air and controlled by an electrically operated control element.

Both manual shut-off valves 10, 14 are used to close the supply lines 7, 8 when the apparatus is no longer in use. The third and fourth shut-off valves 18, 19 serve to start and stop the production and dispensing of the reaction mixture. The first and second automatic shut-off valve 12, 16 are used to relieve the pressure of the last part of the first and second supply lines 7, 8 by means of the pressure vessels 13, 17 when the third and fourth shut-off valve 18, 19 have been closed. As a result, the pressure is relieved from this third and fourth shut-off valve 18, 19, so that no more reaction component can seep into the mixing head 5 if the third and fourth shut-off valves 18, 19 do not provide a 100% sealing.

The spray gun used in the apparatus may be for example a spray gun as described and shown in U.S. Pat. No. 5,375,743. Such a spray gun makes it possible to mix the two reaction components efficiently at relatively low pressures. For more details on this spray gun, reference is made to U.S. Pat. No. 5,375,743, which is included herein by way of reference.

Figure 5:
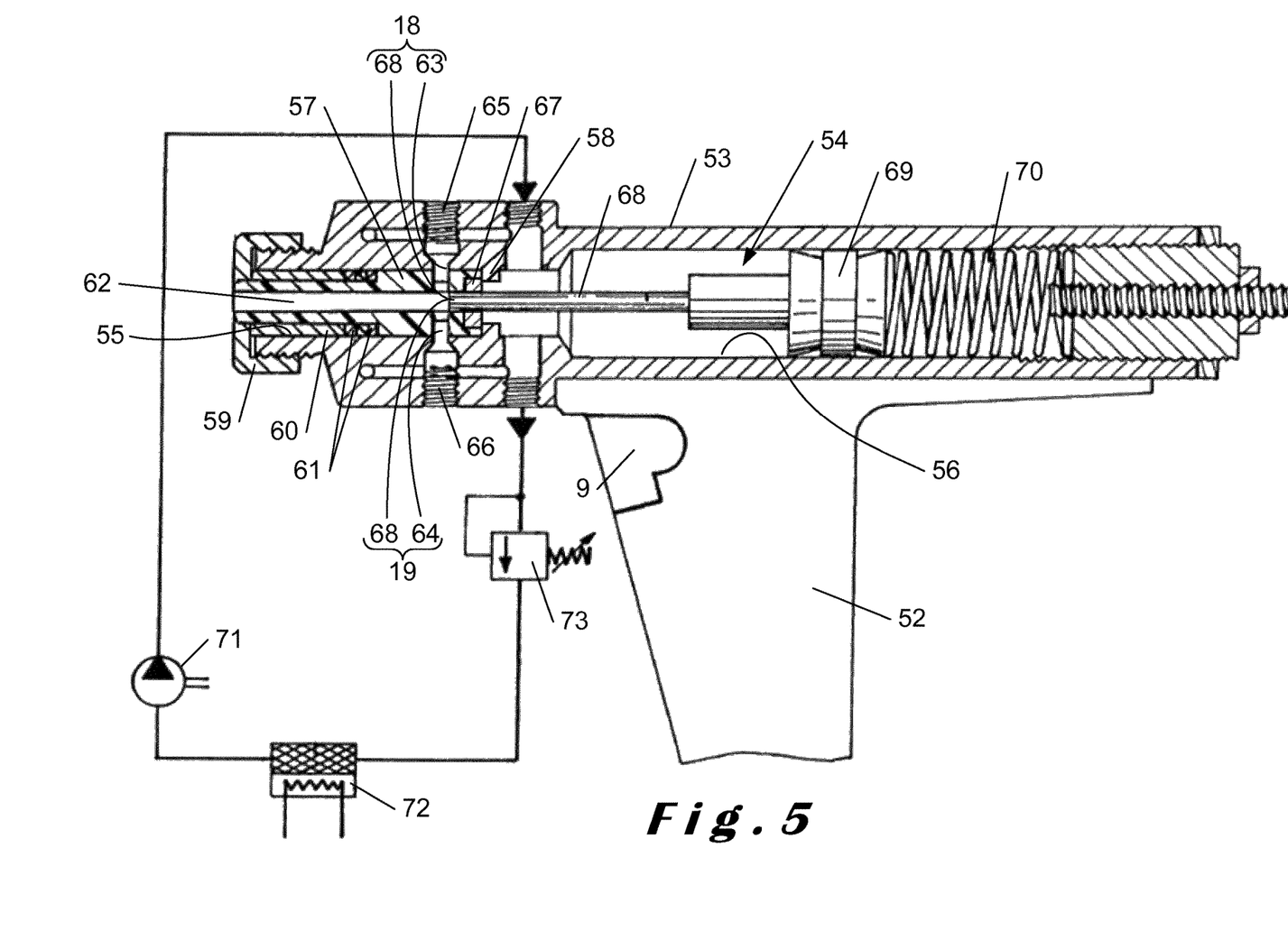
FIGS. 5 and 6 schematically show a longitudinal section through a mixing head used in the apparatus for mixing the two reaction components respectively in its open and in its closed position.
Figure 6:
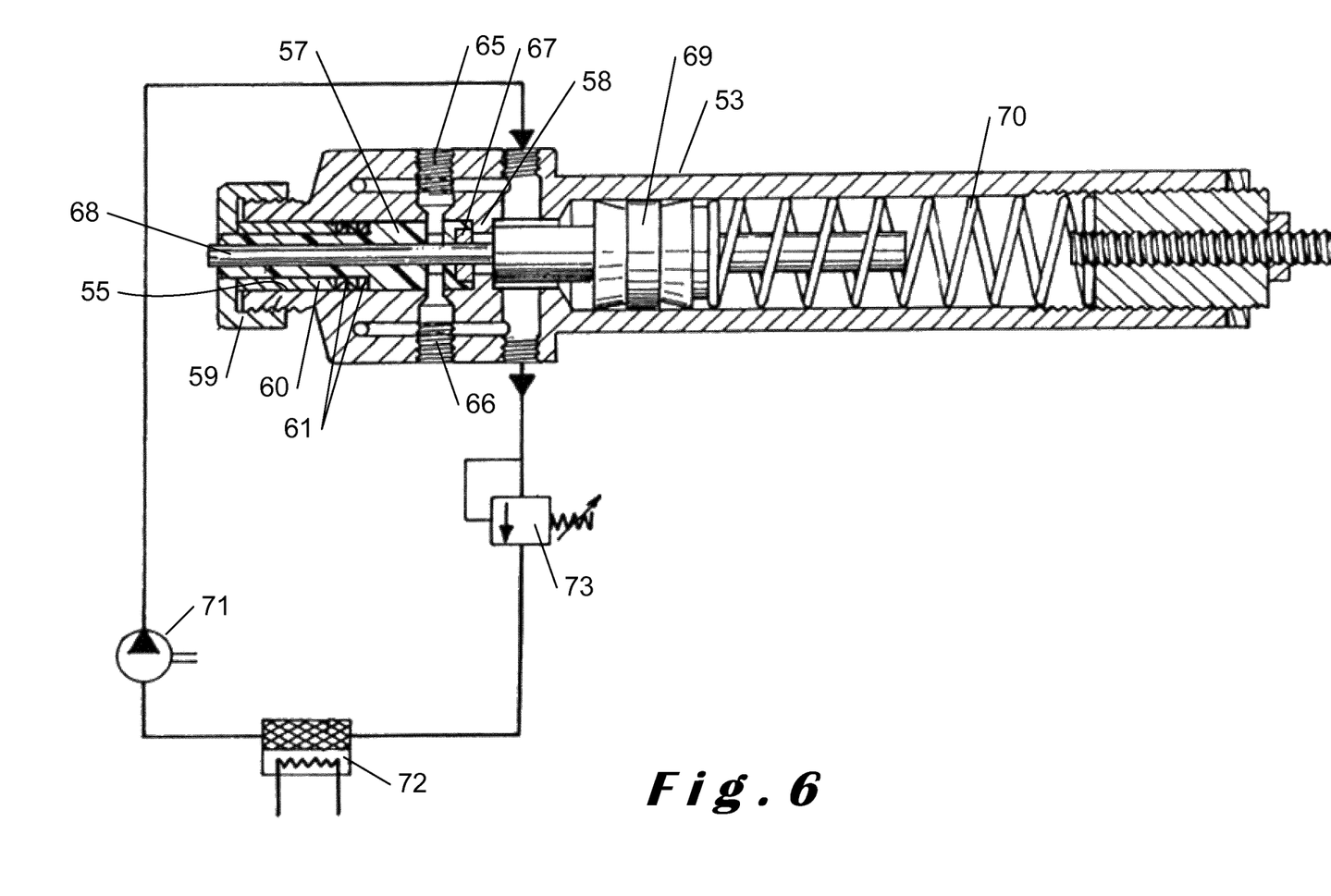

FIGS. 5 and 6 correspond to FIGS. 5 and 6 of this US patent and show the main parts of the spray gun according to the second embodiment disclosed therein. The spray gun comprises a grip 52 which carries the trigger 9. The mixing head 5 of the spray gun is fixed to the grip 52 and comprises a metal barrel 53 which has a cylindrical longitudinal boring 54. The boring 54 comprises two parts, namely a first part 55, at one side of the barrel 53, and a second part 56, at the other side of the barrel 53. The first part 55 of the boring 54 has a smaller diameter than the second part 56 thereof.

A cylindrical core 57, made of a synthetic material, in particular of PTFE, is pressed in the first part 55 of the boring 54. With one of its extremities, which is provided with a conical washer piece 67, it engages a collar 58 in the first part 55 of the boring 54 and is pressed against this collar 58 by means of a screw cap 59, a metal sleeve 60 and Belleville washers 61. The cylindrical core 57 is provided with a longitudinal boring which forms the mixing chamber 62 of the mixing head 5.

The mixing chamber 62 is provided at one extremity with the outlet 6 for the reaction mixture and, at it other extremity, with a first inlet 63, for the first reaction component, and with a second inlet 64, for the second reaction component. The first inlet 63 is connected via a first screw connector 65 to the first supply line 7 whilst the second inlet 64 is connected via a second screw connector 66 to the second supply line 8. Both reaction components are injected under pressure into the mixing chamber 62 and impinge onto each other so as to be mixed instantaneously.

The mixing head 5 further comprises a plunger 68 which fits into the mixing chamber 62 and which can slide therein in its longitudinal direction. In one of its two extreme positions, namely in the open position of the mixing head 5 illustrated in FIG. 5, the plunger 68 is retracted from the mixing chamber 62 whilst in its other extreme position, namely in the closed position of the mixing head 5 illustrated in FIG. 6, it extends entirely through the mixing chamber 62 and through the outlet 6 thereof. In the open position, illustrated in FIG. 5, the reaction components are injected through the inlets 63 and 63 into the mixing chamber 62 and the reaction mixture is ejected out of the mixing chamber 62 through the outlet 6 thereof. In the closed position, illustrated in FIG. 6, the inlets 63 and 64 are closed-off by means of the plunger 68 and any reaction mixture produced in the mixing chamber 62 has been push-out thereof by means of the plunger 68. Due to the axial pressure exerted by the Belleville washers 61 onto the cylindrical core 57, the synthetic material of this core 57 is compressed somewhat and is pressed against the lateral side of the plunger 68 to achieve an optimum sealing effect. In the mixing head 5 illustrated in FIGS. 5 and 6, the third shut-off valve 12 is comprised of the first inlet 63 which co-operates with the plunger 68 to be opened or closed whilst the fourth shut-off valve 19 is comprised of the second inlet 64 which co-operates with the same, common plunger 68 to be simultaneously opened or closed.

To be able to move the plunger 68 between its two extreme positions, it is connected to a piston 69 which slides within the second part 56 of the cylindrical boring 54 of the barrel 53. The piston 69 is urged by means of a compression spring 70 in the direction wherein the inlets 63 and 64, or in other words the third 18 and the fourth shut-off valves 19 are closed. To open these valves 18 and 19, a hydraulic fluid can be pumped by means of a pump 71 in the second part 56 of the cylindrical boring 54, on the other side of the piston 69.

In the embodiment illustrated in FIGS. 5 and 6 the pump 71 circulates the hydraulic fluid through the mixing head 5 over a filter with heat exchanger 72 to be able to heat the mixing head 5. An electro-hydraulic valve 73 in the hydraulic circuit enables to produce the required hydraulic pressure in the mixing head 5 to open the third 18 and the fourth shut-off valves 19 upon electrical actuation of the electro-hydraulic valve 73. The hydraulic fluid comprises preferably a solvent, for example Mesamoll® to rinse the plunger 68 in its retracted position.

Alternatively, in case no heating of the mixing head 5 is required, the actuation of the plunger 68 can be simplified by using a pneumatic system to actuate the plunger 68. The second part 56 of the cylindrical boring 54 of the barrel 53 can for example be connected to a source of compressed air over a solenoid valve, for example to the pneumatic system described hereinafter for controlling the operation of the different shut-off valves.

Especially when both supply lines 7, 8 comprise a flexible hose, these supply lines 7, 8 will expand elastically under the pressure of the reaction component present in them when they are connected to containers 1, 2. To relieve the pressure from these lines 7, 8, part of the reaction component present in them must be able to flow from the lines, in such a way that the lines can shrink again and no longer exert further pressure on the reaction component. For the first supply line 7, the excess of the first reaction component can flow into the first pressure vessel 13 after the first and third shut-off valves 12, 18 have been closed, while the excess of the second reaction component, after the closure of the second and fourth shut-off valves 13, 19, can flow into the second pressure vessel 17.

Figure 2:
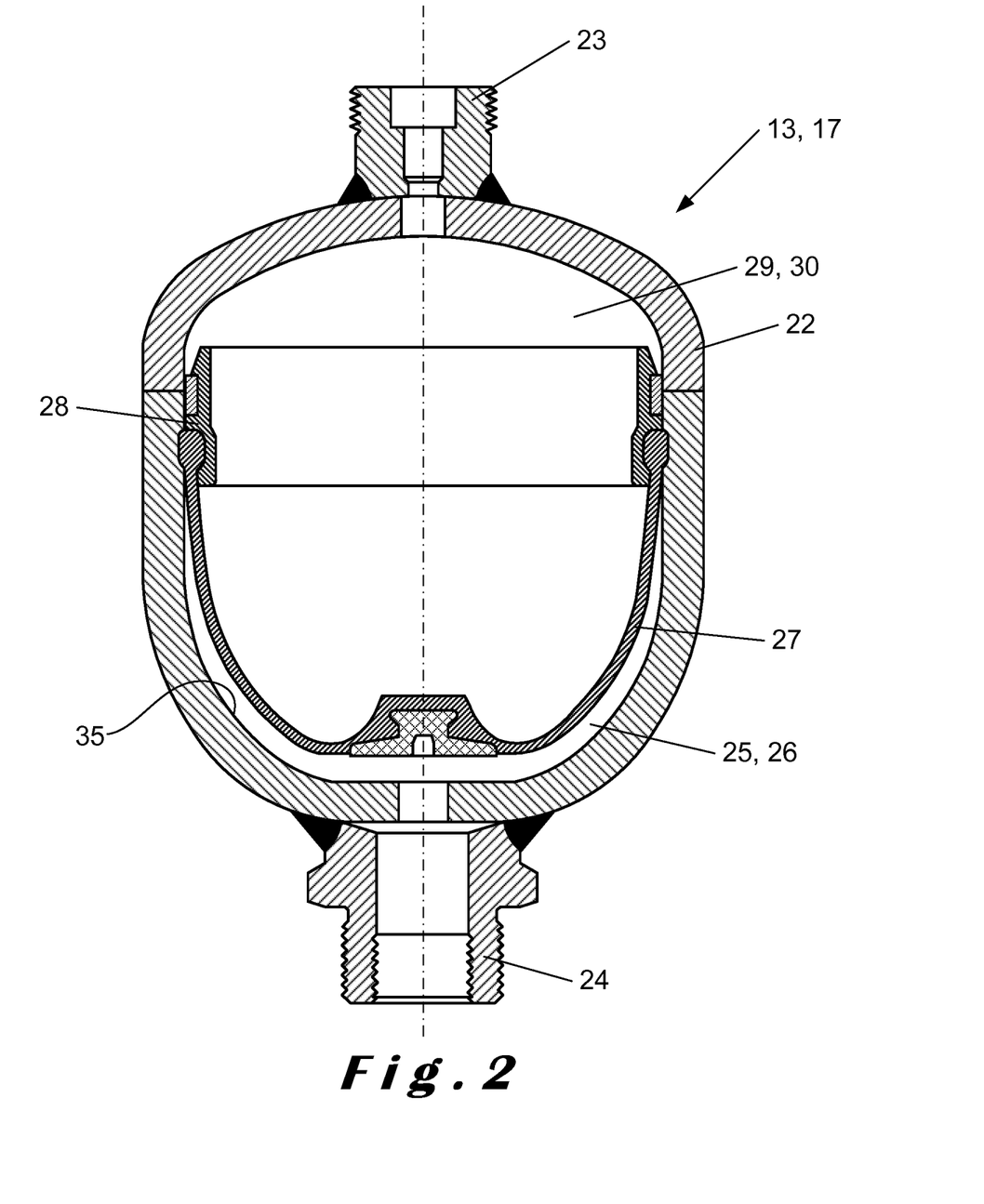
FIG. 2 schematically shows a longitudinal section through the two pressure vessels applied in the apparatus shown in FIG. 1.

The structure of both pressure vessels 13, 17 is depicted in FIG. 2. The pressure vessel consists of a metal casing 22 with a detachable coupling 23 at the top, in particular a screw coupling, for connecting the pressure vessel to a compressed air line and a detachable coupling 24 at the bottom, in particular a screw coupling, for connecting the pressure vessel to the first or second supply line 7, 8. Within casing 22, a first, respectively a second expansion chamber 25, 26 is formed for the reaction component by a flexible membrane (diaphragm) 27 that divides the space inside the pressure vessel in two. The free edge of membrane 27 is clamped to the inside of casing 22 by means of a plastic ring 28.

The first or second chamber 29, 30 respectively on the other side of membrane 27 is connected to a compressor 44 for compressed air with a compressed air line 45, 46. For the first pressure vessel 13, this compressed air line 45 is part of a first pneumatic system for the pressurisation of and pressure relief from the first expansion chamber 25, while for the second pressure vessel, the compressed air line 46 forms part of a second pneumatic system for the pressurisation of and pressure relief from the second expansion chamber 26. Since the first expansion chamber 25 is connected to the first supply line 7 and the second expansion chamber 26 to the second supply line 8, these supply lines 7, 8 will be pressurized or depressurised together with the expansion chambers 25, 26.

The first pneumatic system comprises, in addition to the compressor 44 and the compressed air line 45, a first solenoid valve 31 in the compressed air line 45, which is connected to the control 20 via electrical wiring 32. When the solenoid valve 31 is electrically energized, the first chamber 29 of the pressure vessel 13 is connected to the compressed air in such a way that it comes under pressure. Via membrane 27, the first expansion chamber 25 also comes under pressure. The pressure exerted on the expansion chamber 25 is preferably greater than the pressure that prevails in the first container 1, for example a pressure of 9 bars, such that the first reaction component will be squeezed out of the expansion chamber 25. If the first automatic shut-off valve 12 has not yet been opened, the part of the first supply line located between the first 12 and the third shut-off valve 18 will be pressurized again. As soon as the first shut-off valve 12 is opened, any excess of the first reaction component can be squeezed back into the first container 1.

When the first 12 and the third shut-off valve 18 are closed, the electrical power can be removed from the solenoid valve 31, as a result of which the first chamber 29 of the pressure vessel 13 is connected to the free atmosphere. The first reaction component can thus flow freely into the first expansion chamber 25, thus relieving the pressure in the first supply line 7, as from the first 12 to the third shut-off valve 18, i.e. pressure is relieved from the entire part of the first supply line 7 which extends between the first 12 and the third shut-off valve 18.

The second pneumatic system works in the same way as the first. It comprises, in addition to the compressor 44 and the compressed air line 46, a second solenoid valve 33 in the compressed air line 46, which is connected to the control 20 via electrical wiring 32. When the solenoid valve 33 is electrically energized, the second chamber 30 of the pressure vessel 17 is connected to the compressed air in such a way that it comes under pressure. Via membrane 27, the second expansion chamber 26 also comes under pressure. The pressure exerted on the expansion chamber 26 is preferably greater than the pressure which prevails in the second container 2, for example a pressure of 9 bars, such that the second reaction component will be squeezed out of the expansion chamber 26. If the first automatic shut-off valve 16 has not yet been opened, the part of the second supply line located between the second and the fourth shut-off valve 16, 19 will be pressurized again. As soon as the second shut-off valve 16 is opened, any excess of the second reaction component can be squeezed back to the second container 2. When the second and the fourth shut-off valves 16, 19 are closed, the electrical power can be removed from the solenoid valve 33, as a result of which the second chamber 30 of the pressure vessel 17 is connected to the free atmosphere. The second reaction component can thus flow freely into the second expansion chamber 26, thus relieving the pressure in the second supply line 8, as from the second to the fourth shut-off valves 16, 19, i.e. pressure is relieved from the entire part of the second supply line 8 which extends between the second 16 and the fourth shut-off valve 19.

In the alternative embodiment depicted in FIG. 4, there is only one common pneumatic system. This system is formed by the valve 31 which is connected to the compressor 44 via the compressed air line 45. A branch line is provided on the compressed air line to the first pressure vessel 13, which simultaneously leads the compressed air to the second pressure vessel 17 via the compressed air line 50. In this embodiment, the pressure vessels 13, 17 are thus simultaneously pressurised or depressurised.

Membrane 27, located in both pressure vessels 13, 17, has a convex shape, with the convex side of membrane 27 facing the expansion chamber 25, 26. Membrane 27 remains preferably convex towards the expansion chamber 25, 26 also when the pressure of the supply line 7, 8 has been relieved and when the excess reaction component has thus ended up in the expansion chamber 25, 26. Since the membrane 27 is thus minimally deformed, it will also be subject to limited wear and tear. Furthermore, due to its convex design, the membrane 27 will be pressed laterally against the casing 22 under the influence of the compressed air, whereby the sealing between the membrane 27 and this casing 22 improves as more pressure is applied to the membrane 27. When the membrane 27 is put under pressure, substantially all of the reaction component will have been squeezed from the pressure vessel 13, 17, and the membrane will be pressed against a support surface 35 provided by the internal surface of the casing 22. Since the membrane does not need to stretch or only to a limited extent, it will be subject to little wear and tear as a result.

The membrane 27 itself is preferably made of a fluoropolymer elastomeric material. It has after all been found that such a material can withstand the chemical influence of the reaction components for a considerable period of time, even if the reaction component is allowed to flow in and out of the expansion chamber more than three hundred thousand times.

The control is connected via the wiring 34 also with the third and fourth shut-off valves 18, 19 and moreover with a sensor on the trigger 9. When both supply lines 7, 8 are pressurised, i.e. when both the first and the second automatic shut-off valves 12, 16 are open, the control system 20 will open the third and the fourth shut-off valves 18, 19 when the trigger 9 is operated, as a result of which the reaction mixture is produced and dispensed through the outlet.

Figure 3:
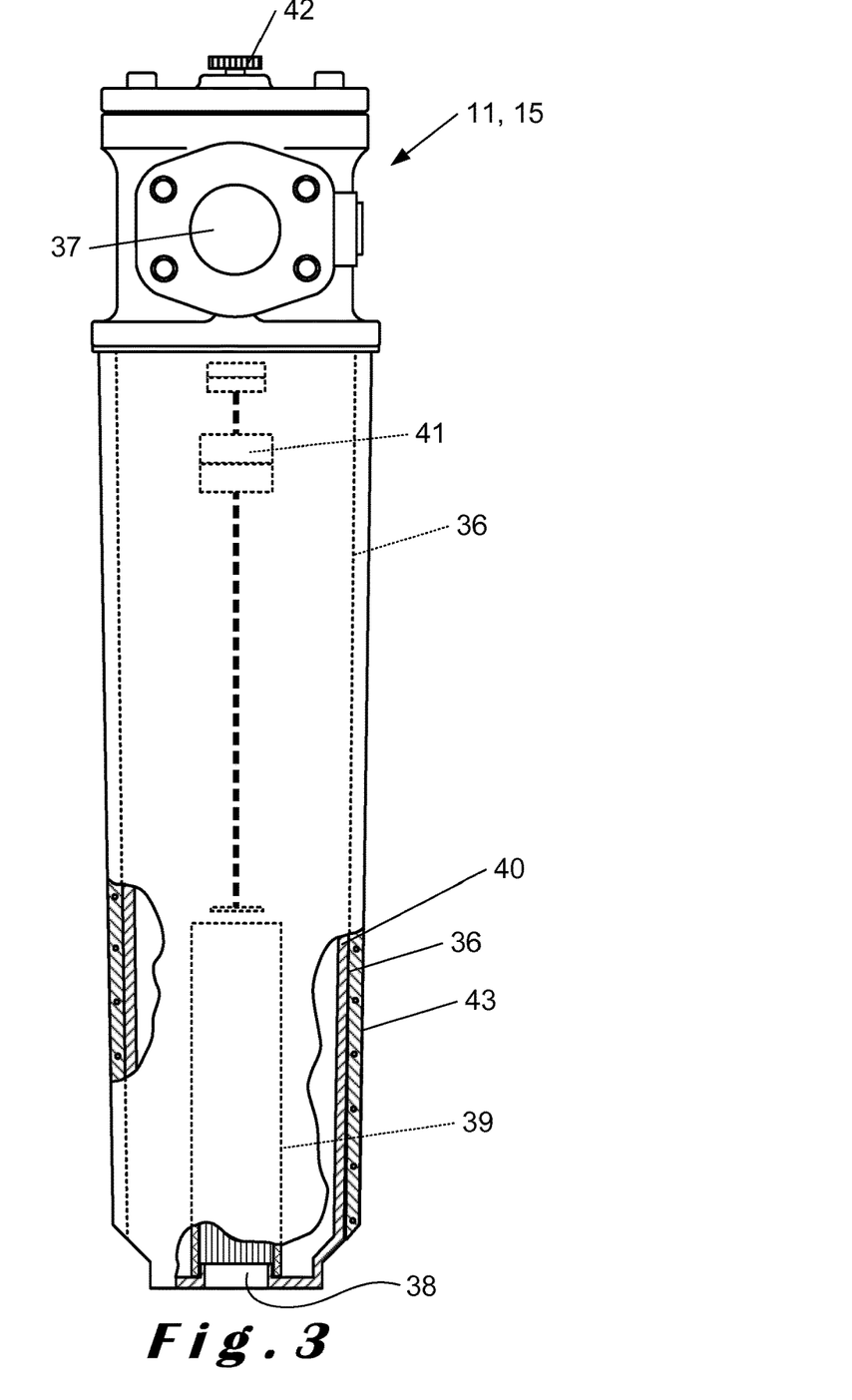
FIG. 3 shows a side view, with partial section, of the two filters and floaters applied in the apparatus shown in FIG. 1.

The structure of both filters 11, 15 of the embodiment in FIG. 1 is shown in more detail in FIG. 3. Filters 11, 15 contain a housing 36 with an inlet 37 at the top and an outlet 38 at the bottom for the reaction component. The outlet 38 is fitted with a filter element 39, arranged to filter the reaction component.

To enable detection of an empty container 1, 2, in the first supply line 7, between the first shut-off valve 12 and the first container 1, a float chamber 40 is provided containing a float 41, arranged to detect the level of the reaction component in the float chamber 40. A same float chamber 40 with float 41 is also provided in the second supply line 8, between the second shut-off valve 12 and the second container 2. Since the reaction components are squeezed into the supply lines 7, 8 at the bottom of the containers 1, 2 under the pressure of the gas in the containers, gas will flow through the supply lines from as soon as the respective container is empty. The gas will then end up in the float chamber 40 where the liquid level will drop, which can be detected by means of the float. The float 41 is preferably arranged to detect an empty container when the float chamber 40 still contains a quantity of reaction component. Control 20 is then preferably configured to continue dispensing the reaction mixture until it is stopped by the actuator, unless this is preceded by the float chamber being empty.

If the float system 40, 41 is independent from the filter 11, 15, as shown in FIG. 4, the float system is preferably located in the supply line 7, 8 between the container 1, 2 and the filter 11, 15. The filters 11, 15 are preferably fitted with a venting system 42 in that case. Since the control 20 ensures that the float chambers 40 will never be empty, the filter 11, 15 only has to be vented once, namely only when the filter elements 39 are replaced.

The float chambers 40 have preferably each an internal volume in excess of 2 litres, preferably in excess of 3 litres and more preferably in excess of 4 litres. When connecting a new container 1, 2, the manual shut-off valves 10, 14 must be open or opened before the containers 1, 2 are pressurised. This will place the gas in the float chamber 40 under atmospheric pressure. When the containers 1, 2 are then placed under pressure, the reaction component will flow through the first part of the supply line into the float chamber, where it will compress the gas present in the float chamber 40. Due to the relatively large volume of the float chamber 40, the compressed gas only takes up a limited proportion of this volume in such a way that the float 41 can continue to operate effectively without the need to vent the float chamber 40. In other words, the float 41 will indicate again shortly after the container is placed under pressure that the container is filled.

However, the float chambers 40 are preferably also equipped with a venting system 51, in particular the float chamber for the isocyanate component. For the isocyanate component, the float chamber 40 should preferably be vented at start-up so that no moisture remains in it. When reconnecting a full container 1, it is no longer necessary to vent the float chamber as only dry nitrogen gas is present in the float chamber 40.

In the embodiment illustrated in FIG. 3, the float chamber 40 and the float 41 are arranged in the housing 36 of the filter 11, 15. The internal volume of the housing 36, which overall forms the float chamber 40, must be sufficiently large to accommodate both the filter element 39 and the float 41. The float 41 can be installed above the filter element 39, as indicated in FIG. 3, but it is also possible to install the float 41 next to the filter element 39. The advantage of placing the float 41 above the filter element 39 is that when the float 41 indicates that the container 1, 2 is empty, there is still a considerable amount of reaction component in the filter/float chamber in order to be able to still produce a relatively large amount of reaction mixture. A further advantage of this arrangement is that the housing 36 can be made more elongated for the same internal volume, so that the housing 36 has a larger surface area. This is advantageous when heating elements 39 are provided in or on the housing, which in the embodiment according to FIG. 3, are formed by a heating jacket 43 applied around the housing 36. Since the housing 36 is elongated and since it has an internal height that in particular amounts to more than three times or even more than five times the average internal diameter of the housing, it has a relatively large surface area and thus a greater capacity for transferring the heat of the heating elements 43 to the reaction component in the housing 36. If the float chamber 40 is not located in the housing 36 of the filter, both the float chamber 40 and the housing 40 can be fitted with heating elements 43.

Instead of, or in addition to the heating elements 43, heating elements are also applied preferably in the supply lines 7, 8 themselves. These heating elements are in particular wire-shaped and located in the supply lines 7, 8 so that the reaction component will flow around them. Efficient heat transfer can be obtained in this manner, so that the heating elements on the float chamber or on the filter may optionally be omitted.

Also, in the preferred embodiment, in which the housing 36 of the filter also forms the float chamber 40, this float chamber has preferably an internal volume in excess of 2 litres, preferably in excess of 3 litres and more preferably in excess of 4 litres. For example, the internal volume of the float chamber 40 is approximately 7 litres. The advantage of this embodiment is that even when replacing the filter element, the housing 36 of the filter does not need to be vented. The internal volume of this housing 36 is indeed so large that when the gas contained in the housing 36 and in the first part of the supply line 7, 8 when the container 1, 2 is replaced, it only occupies a limited proportion of the internal volume of the housing 36 when it is pressurised, which means that the float 41 can continue to operate effectively. It is of course recommended that the outlet of the float chamber 40 is located at the bottom, more in particular at a level where reaction component will always remain present, managed by control system 20, in order to prevent gas ending up in the mixing head 5 through the supply lines where it would disrupt the mixing process.

The various phases of operation of the apparatus under the control of control system 20 and the transitions between these phases are indicated in table 1 below.

TABLE 1

Phases in the operation of the apparatus

| Phase | $1^{st}$ and $2^{nd}$ expansion chamber (25 and 26) | $1^{st}$ and $2^{nd}$ shut-off valve (12 and 16) | $3^{rd} + 4^{th}$ shut-off valve (18 and 19) | Squeeze trigger (9) | Release trigger (9) |
|---|---|---|---|---|---|
| a | no pressure | closed | closed | a→b upon squeezing of trigger | |
| b | pressure | closed | closed | b→c after 0.5 sec | b→c after 0.5 sec |
| c | pressure | open | closed | c→d after 1 sec | c→e |
| d | pressure | open | open | As long as trigger remains squeezed | d→e upon release of trigger |
| e | pressure | open | closed | e→d upon squeezing trigger again | e→f after 15 sec |
| f | pressure | closed | closed | f→a | f→a |

In phase a the pressure vessels 13, 17 are in connection with the atmosphere via the solenoid valves 31, 33 and the expansion chambers 25, 26 are therefore under atmospheric pressure. Upon squeezing the trigger 9, the solenoid valves 31, 33, or only the solenoid valve 31 in the embodiment according to FIG. 4, connect the pressure vessels 13, 17 with the compressed air, as a result of which the expansion chambers 25, 26 are pressurised (phase b). In a next step, the first and the second shut-off valves 12, 16 are opened, as a result of which the supply lines 7, 8 come under pressure from the containers 1, 2 (phase c). This only happens after 0.5 sec to ensure that the expansion chambers 25, 26 are pressurised, which prevents expansion chambers 25, 26 from being filled with reaction component under pressure from the containers 1, 2, which would cause membrane 27 to deform too much and which could potentially even cause reaction component to seep between membrane 27 and the wall of the pressure vessel. After 1 sec, the third and fourth shut-off valves 18, 19 are opened, thus starting the production of the reaction mixture in the mixing head 5 under the pressure exerted in the containers 1, 2 on the reaction components (phase d). This phase d of the production and dispensing of the reaction mixture continues for as long as the trigger 9 remains squeezed. Upon the release of the trigger 9, the third and fourth shut-off valves 18, 19 will close, thereby stopping the production and dispensing of the reaction mixture (phase e).

Phase e, in which the supply lines 7, 8 remain under the pressure prevailing in containers 1, 2, is maintained for 15 seconds. The apparatus is thus in standby mode, during which squeezing trigger 9 again will immediately restart the production and dispensing of the reaction mixture, through a transition to phase d. If the trigger 9 is not pressed again during the standby phase, the first and second shut-off valves 12, 16 will also close in phase f and then immediately switch to phase a again by reconnecting the pressure vessels 13, 17 to the atmospheric pressure by means of the solenoid valves 31, 33.

If the trigger 9 is only pressed for a short time, and for example already released in phase b or c, the apparatus follows the same cycle, nevertheless skipping phase d. This ensures that the two expansion chambers 25, 26 are always emptied before the first and the second shut-off valve 12, 16 are closed in such a way that the two expansion chambers 25, 26 are always fully available for depressurising the supply lines 7, 8.

The invention claimed is:

1. An apparatus for producing and dispensing a reaction mixture starting from at least a first reaction component and a second reaction component that are under a first pressure in a first container and a second pressure in a second container respectively, the apparatus comprising:
- a mixing head configured for mutually mixing said first reaction component and said second reaction component, wherein the mixing head comprises an outlet configured for the mixture of first and second reaction components;
- a first supply line configured for feeding the first reaction component from said first container under the first pressure prevailing therein to the mixing head;
- a second supply line configured for feeding the second reaction component from said second container under the second pressure prevailing therein to the mixing head;
- a first shut-off valve in said first supply line and a second shut-off valve in said second supply line, the first shut-off valve and the second shut-off valve each having an open position and a closed position;
- a third shut-off valve configured for shutting off the first supply line in said mixing head and a fourth shut-off valve configured for shutting off the second supply line in said mixing head, the third shut-off valve and the fourth shut-off valve comprising a common plunger configured to slide, for opening and closing the third shut-off valve and the fourth shut-off valve simultaneously;
- a first expansion chamber connected to the first supply line between said first shut-off valve and said third shut-off valve;
- a second expansion chamber connected to the second supply line between said second shut-off valve and said fourth shut-off valve;
- a pneumatic system configured for the pressurization and pressure-relief of the first expansion chamber and of said first supply line as from said first shut-off valve to said third shut-off valve, and for the pressurization and pressure-relief of the second expansion chamber and of said second supply line as from said second shut-off valve to said fourth shut-off valve; and
- a control system configured for operating said pneumatic system and said first, second, third and fourth shut-off valves for starting and stopping production and dispensing of said reaction mixture,
- wherein said first expansion chamber and said second expansion chamber, respectively, are formed by a first pressure vessel and a second pressure vessel having each two sides separated from each other by a membrane, of which a first side forms the first expansion chamber and respectively the second expansion chamber, configured to be filled with said first reaction component and respectively said second reaction component, and of which a second side is connected to said pneumatic system and configured to be filled with a gas, which gas is in contact through said membrane with the respective first reaction component and the second reaction component in the first side;
- wherein said pneumatic system is provided to bring the first expansion chamber under a third pressure which is higher than said pressure in the first container and to bring the second expansion chamber under a fourth pressure which is higher than said pressure in the second container;
- wherein said membrane is convex, the convex side of the membrane being directed respectively towards the first and the second expansion chamber, and the first and the second pressure vessel being provided with a support surface for limiting the movement of said membrane in the direction of respectively said first and said second expansion chamber, with the membrane being pressed against the support surface when the first reaction component is fed from said first container under the pressure prevailing in the first container to the mixing head and when the second reaction component is fed from said second container under the pressure prevailing in the second container to the mixing head; and
- wherein said first pressure vessel and said second pressure vessel are detachably connected to said pneumatic system and to the first supply line and the second supply line respectively.

2. The apparatus according to claim 1, wherein said control system comprises an actuator configured for starting and stopping production and dispensing of the reaction mixture.

3. The apparatus according to claim 1, wherein said control system is configured to pressurize said first expansion chamber and second expansion chamber with the said pneumatic system before opening said first shut-off valve and said second shut-off valve.

4. The apparatus according to claim 3, wherein said control system is configured to open the third shut-off valve and the fourth shut-off valve after having opened said first shut-off valve and second shut-off valve.

5. The apparatus according to claim 1, wherein said control system is configured to close said third shut-off valve and said fourth shut-off valve.

6. The apparatus according to claim 1, wherein said control system is configured to relieve pressure from said first expansion chamber and second expansion chamber after said third shut-off valve and fourth shut-off valve are closed.

7. The apparatus according to claim 6, wherein said control system is configured to relieve pressure from said first expansion chamber and said second expansion chamber only after a predetermined period of time after having closed the third shut-off valve and fourth shut-off valve.

8. The apparatus according to claim 6, wherein said control system is configured to close said first shut-off valve and said second shut-off valve before pressure is released from said first expansion chamber and said second expansion chamber.

9. The apparatus according to claim 1, wherein said pneumatic system is configured to pressurize the gas in the second side of the first pressure vessel and the second pressure vessel to atmospheric pressure when releasing pressure from the first expansion chamber and the second expansion chamber.

10. The apparatus according to claim 1, wherein the support surface is configured for completely supporting the membrane.

11. The apparatus according to claim 1, wherein said control system is configured to open said third shut-off valve and said fourth shut-off valve after the membrane of the first pressure vessel and the second pressure vessel has been pressed by the pneumatic system against said support surface.

12. The apparatus according to claim 1, wherein said membranes of the first pressure vessel and the second pressure vessel remain convex when pressure is relieved from the first expansion chamber and the second expansion chamber.

13. The apparatus according to claim 1, wherein said membranes of the first pressure vessel and the second pressure vessel have a bladder shape, the first expansion chamber and the second expansion chamber being located outside the bladder shape.

14. The apparatus according to claim 1, wherein said membranes of the first pressure vessel and the second pressure vessel are made from a fluoropolymer elastomeric material.

15. The apparatus according to claim 1, wherein a first float chamber and a second float chamber, containing a first float and a second float respectively, are disposed respectively in said first supply line, between said first shut-off valve and said first container, and in said second supply line, between said second shut-off valve and said second container, the first and the second float being configured to detect a level of respectively the first reaction component and the second reaction component in the first float chamber and the second float chamber.

16. The apparatus according to claim 1, wherein a first filter and a second filter are disposed respectively in said first supply line, between said first valve and said first container, and in said second supply line, between said second valve and said second container, which first and second filters are located respectively in a first housing and in a second housing.

17. The apparatus according to claim 15, wherein a first filter and a second filter are disposed respectively in said first supply line, between said first valve and said first container, and in said second supply line, between said second valve and said second container, which first and second filters are located respectively in a first housing and in a second housing, and wherein said first housing and said second housing respectively also form said first float chamber and said second float chamber.

18. The apparatus according to claim 15, wherein a first filter and a second filter are disposed respectively in said first supply line, between said first valve and said first container, and in said second supply line, between said second valve and said second container, which first and second filters are located respectively in a first housing and in a second housing, and wherein said first float chamber is located in the first supply line between the first filter and the first container, and wherein said second float chamber is located in the second supply line between the second filter and the second container.

19. The apparatus according to claim 16, wherein the first housing and the second housing each comprise a heating element configured to heat respectively the first reaction component and the second reaction component in the first filter and the second filter.

20. The apparatus according to claim 1, wherein said first container and said second container are configured to be pressurized to 5 to 10 bars.

21. The apparatus according to claim 1, wherein said pneumatic system comprises a first pneumatic system configured for pressurization of and pressure relief from the first expansion chamber and from said first supply line as from said first shut-off valve to said third shut-off valve and a second pneumatic system for pressurization of and pressure relief from the second expansion chamber and from said second supply line as from said second shut-off valve to said fourth shut-off valve.

22. The apparatus according to claim 1, wherein said pneumatic system comprises a common pneumatic system for pressurization of and the pressure relief from the first expansion chamber and the second expansion chamber and said first supply line as from said first shut-off valve to said third shut-off valve and said second supply line as from said second shut-off valve to said fourth shut-off valve.

23. The apparatus according to claim 1, further comprising said first container, which is filled with the first reaction component, and further comprising said second container, which is filled with the second reaction component, wherein said first supply line is connected to the first container and said second supply line is connected to the second container.

24. A method for producing and dispensing a reaction mixture with the apparatus according to claim 1, the method comprising:
connecting said first supply line to said first container which is filled with the first reaction component;
connecting said second supply line to said second container which is filled with the second reaction component; and then pressurizing the first container and the second container.

25. The method according to claim 24, further comprising:
replacing said first container upon being empty, with a filled first container; and
replacing said second container upon being empty, with a filled second container.

26. The method according to claim 24, the reaction mixture being a polyurethane reaction mixture containing no physical blowing agents to be dispensed as a froth, and the first container and the second container being configured to be pressurized.

27. The method of claim 26, wherein the first container contains an isocyanate reaction component and the second container contains a polyol reaction component containing water as blowing agent for producing a polyurethane foam.

28. The method according to claim 27, wherein the polyol reaction component is free of physical blowing agents.

* * * * *